(12) United States Patent
Hehn et al.

(10) Patent No.: US 12,382,566 B2
(45) Date of Patent: Aug. 5, 2025

(54) SYSTEM AND METHOD FOR CONTROLLING A LIGHT SOURCE FOR ILLUMINATING A SCENE OF INTEREST

(71) Applicant: Verity AG, Zürich (CH)

(72) Inventors: Markus Hehn, Zürich (CH); Luciano Beffa, Zürich (CH)

(73) Assignee: Verity AG, Zurich (CH)

( * ) Notice: Subject to any disclaimer, the term of this patent is extended or adjusted under 35 U.S.C. 154(b) by 174 days.

(21) Appl. No.: 18/270,388

(22) PCT Filed: Dec. 13, 2021

(86) PCT No.: PCT/IB2021/061632
§ 371 (c)(1),
(2) Date: Jun. 29, 2023

(87) PCT Pub. No.: WO2022/144652
PCT Pub. Date: Jul. 7, 2022

(65) Prior Publication Data
US 2024/0074018 A1    Feb. 29, 2024

Related U.S. Application Data

(60) Provisional application No. 63/132,080, filed on Dec. 30, 2020.

(51) Int. Cl.
*H05B 47/115* (2020.01)
*B64D 47/04* (2006.01)
(Continued)

(52) U.S. Cl.
CPC ........... *H05B 47/115* (2020.01); *B64D 47/04* (2013.01); *G01C 21/206* (2013.01); *G06T 7/73* (2017.01);
(Continued)

(58) Field of Classification Search
CPC ...... H05B 47/115; H05B 33/12; B64D 47/04; G01C 21/206; G06T 7/73;
(Continued)

(56) References Cited

U.S. PATENT DOCUMENTS

2005/0182518 A1* 8/2005 Karlsson ................ G06V 10/84
700/253
2018/0045519 A1* 2/2018 Ghadiok ................... G06T 7/74
(Continued)

FOREIGN PATENT DOCUMENTS

CN          111562791 A       8/2020
DE     102016205870 A1 * 10/2017 ............. G01C 21/30

OTHER PUBLICATIONS

International Search Report and Written Opinion for PCT/IB2021/061632, dated Mar. 21, 2022, 11 pages.

*Primary Examiner* — Abdullah A Riyami
*Assistant Examiner* — Syed M Kaiser
(74) *Attorney, Agent, or Firm* — Blank Rome LLP

(57) ABSTRACT

The invention relates to a method for controlling a light source (7), the method using (a) at least one pose estimate (1) of a camera (8) configured to capture one or more images of a scene of interest (13) which comprises at least one landmark (9), as said light source is operated to emit light which illuminates said scene of interest, (b) a landmark map (2) comprising at least 3D location information of a plurality of landmarks comprising the at least one landmark in the scene of interest, (c) an illumination model (3) describing a relationship between an emission illumination power and reflection illumination power, wherein said emission illumination power is the power of light emitted by the light source (7) to illuminate said scene of interest, and said reflection illumination power is the illumination power of light reflected by one or more landmarks in said scene of interest and received by the camera, and (d) a predefined threshold
(Continued)

reflection illumination power (4). The method comprises the following steps: (a) determining (5), for at least one of the plurality of landmarks, at least one optimized emission illumination power of light (6) to be emitted by the light source, and an illumination time course (6) during which the light source should be operated to emit light which has an emission illumination power which is equal to the at least one optimized emission illumination power, using (i) the at least one pose estimate (1) of the camera, (ii) the 3D location information of the at least one of the plurality of landmarks, (iii) the illumination model (3), and (iv) the predefined threshold reflection illumination power (4); and (b) operating the light source (7) to emit light which has an emission illumination power which is equal to the at least one optimized emission illumination power (6), for a time period which is equal to the determined illumination time course (6).

21 Claims, 1 Drawing Sheet

(51) Int. Cl.
*B64U 101/00* (2023.01)
*B64U 101/30* (2023.01)
*G01C 21/20* (2006.01)
*G06T 7/73* (2017.01)
*B64U 10/13* (2023.01)
*B64U 20/87* (2023.01)
*B64U 101/70* (2023.01)

(52) U.S. Cl.
CPC .............. *B64U 10/13* (2023.01); *B64U 20/87* (2023.01); *B64U 2101/00* (2023.01); *B64U 2101/30* (2023.01); *B64U 2101/70* (2023.01); *G06T 2207/30204* (2013.01); *G06T 2207/30244* (2013.01)

(58) Field of Classification Search
CPC . G06T 2207/30204; G06T 2207/30244; G06T 2207/10152; G06T 2207/30208; G06T 2207/30268; B64U 10/13; B64U 20/87; B64U 2101/00; B64U 2101/30; B64U 2101/70; B64U 2201/10; G03B 15/006; G03B 15/03; G03B 35/00; G06V 10/141
See application file for complete search history.

(56) References Cited

U.S. PATENT DOCUMENTS

| | | |
|---|---|---|
| 2018/0094935 A1 | 4/2018 | O'Brien et al. |
| 2018/0113200 A1* | 4/2018 | Steinberg ............ G02B 26/0858 |
| 2018/0306589 A1* | 10/2018 | Holz ........................ G01C 21/28 |
| 2018/0307941 A1* | 10/2018 | Holz .................. G06V 30/1988 |
| 2019/0049944 A1 | 2/2019 | Pohl |
| 2019/0107844 A1 | 4/2019 | Qin et al. |
| 2019/0138011 A1 | 5/2019 | Bloeckner et al. |
| 2020/0117219 A1 | 4/2020 | Russell |
| 2020/0130864 A1 | 4/2020 | Brockers et al. |

* cited by examiner

SYSTEM AND METHOD FOR CONTROLLING A LIGHT SOURCE FOR ILLUMINATING A SCENE OF INTEREST

RELATED APPLICATIONS

This application is a national phase of PCT/IB2021/061632, filed on Dec. 13, 2021, which claims priority to U.S. Provisional Application No. 63/132,080, filed on Dec. 30, 2020. The contents of these applications are hereby incorporated by reference in their entirety.

FIELD OF THE INVENTION

The present invention relates to a method and system for controlling light emission of a light source for illuminating a scene of interest.

BACKGROUND TO THE INVENTION

Indoor navigation of robots, for example drones, is an important problem, e.g., in the field of automatic warehousing. To facilitate indoor navigation, the robot, e.g., the drone, needs to know its current position with respect to its environment. Contrary to outdoor environments in which GNSS (Global Navigation Satellite Systems) can be employed, providing a high localization accuracy, GNSS in indoor environments is often not reliable due to signal attenuation and multi-path effects. Existing RF localization technologies for indoor and outdoor spaces also struggle with signal attenuation and multi-path effects limiting the usability in complex environments, for instance, in the presence of a significant amount of metal.

In the prior art, optical localization systems for indoor localization are known. Such optical localization systems extract information from images captured by a camera. The location of an object of which the pose is to be determined can then be computed using triangulation techniques after relating the coordinates of features in the two-dimensional camera image to three-dimensional rays corresponding to said features. The relation between image coordinates and three-dimensional rays is typically captured in a combination of first-principle camera models (such as pinhole or fisheye camera models) and calibrated distortion models (typically capturing lens characteristics, mounting tolerances, and other deviations from a first-principle model).

In optical localization systems for determining the location of an object known in the prior art, the camera can be rigidly mounted outside the object, observing the motion of the object ("outside-in tracking"), or the camera can be mounted on the object itself observing the apparent motion of the environment ("inside-out tracking"). While outside-in tracking localization systems typically determine the location of the object relative to the known locations of the camera(s), inside-out tracking systems like SLAM (Simultaneous Localization and Mapping) typically generate a map of the environment in which the object moves. The map is expressed in an unknown coordinate system but can be related to a known coordinate system in case the locations of at least parts of the environment are already known or if the initial pose of the camera is known. In both cases, some error will accumulate as the map is expanded away from the initial field of view of the camera or from the parts of the environment with known location. The potential for propagating errors is a problem for applications where the location information must be referred to external information, for example to display the location of the object in a predefined map, to relate it to the location of another such object, or when the location is used to guide the object to a location known in an external coordinate system.

A significant challenge of optical systems is the extraction of information from the camera image for tracking purposes. For outside-in systems, this entails recognizing the object to be tracked in the image. In inside-out systems, it typically entails extracting "good" features and recognizing them in consecutive images, for example using scale-invariant feature transform (SIFT) to detect and annotate features. This is complicated by illuminance routinely varying by many orders of magnitude and the reflectivity of surfaces additionally varying by orders of magnitude. For example, full daylight is about 10,000 lux while full moon is only 0.1 lux. In contrast to this, a single-exposure image taken by an image sensor typically only has 2-3 orders of magnitude of dynamic range (e.g., a 10-bit sensor provides 1024 discrete measurement steps of incident light). This makes it difficult to correctly configure the image sensor sensitivity and exposure time, and additionally makes it difficult to track features relating to a common landmark from image to image, especially in case camera settings change between images. This severely limits the robustness of optical systems in difficult lighting conditions.

In some instances, optical localization systems known in the prior art reduce the impact of varying lighting conditions by 1) adding illuminance to the scene by using torches or strobes; this technique reduces the required dynamic range by increasing the lower limit of the scene illuminance; 2) adding high-contrast landmarks (that is, areas of differing reflectance) to the scene; in the case of outside-in systems this is often combined with strobes in the form of (retro-)reflectors attached to the tracked object; in the case of inside-out systems this often takes the form of high-contrast wall decorations, carpets, etc.; 3) moving out of the visible-light spectrum into the IR or UV spectra; the non-visible-light illuminance can usually be controlled more easily in indoor spaces because there is no need to adjust it to human preferences; this is typically combined with torches or strobes to add a controlled amount of illuminance.

Outside-in optical localization systems typically scale very poorly to larger localization systems because at every point, the object must be seen by several cameras in order to triangulate the 3D position of the object. Especially for large spaces where only few objects are tracked this is economically not viable.

It is an object of the present invention to mitigate at least some of the disadvantages associated with the methods for controlling light sources which are used to illuminate a scene of interest; in particular, to mitigate at least some of the disadvantages associated with the methods for controlling light sources, which are used to illuminate a scene of interest, in localization systems.

SUMMARY OF THE INVENTION

According to a first aspect of the present invention there is provided a method for controlling a light source, involving the steps recited in claim 1. Further features and embodiments of the method of the present invention are described in the dependent patent claims.

The invention relates to a method for controlling a light source, the method using (a) at least one pose estimate of a camera configured to capture one or more images of a scene of interest which comprises at least one landmark, as said light source is operated to emit light which illuminates said scene of interest, (b) a landmark map comprising at least 3D location information of a plurality of landmarks comprising the at least one landmark in the scene of interest, (c) an illumination model describing a relationship between an emission illumination power and reflection illumination power, wherein said emission illumination power is the power of light emitted by the light source to illuminate said scene of interest, and said reflection illumination power is the illumination power of light reflected by one or more landmarks in said scene of interest and received by the camera, and (d) a predefined threshold reflection illumination power. The method comprises the following steps: (a) determining, for at least one of the plurality of landmarks, at least one optimized emission illumination power of light to be emitted by the light source, and an illumination time course during which the light source should be operated to emit light which has an emission illumination power which is equal to the at least one optimized emission illumination power, using (i) the at least one pose estimate of the camera, (ii) the 3D location information of the at least one of the plurality of landmarks, (iii) the illumination model, and (iv) the predefined threshold reflection illumination power; and (b) operating the light source to emit light which has an emission illumination power which is equal to the at least one optimized emission illumination power, for a time period which is equal to the determined illumination time course.

The light source is configured to illuminate the scene of interest, e.g., a part of a warehouse. The plurality of landmarks is arranged in the scene of interest, and a 3D position of the landmarks in the scene of interest is a priori known, e.g., expressed in a world coordinate system. Alternatively, an estimate of a 3D position of the landmarks, or of at least some landmarks, in the scene of interest is available. The 3D position of the landmarks is stored in the landmark map. The landmark map may also comprise additional information on the landmarks, e.g., information on whether a landmark is embodied as a retroreflector, its coefficient of reflection, a directivity profile of reflection etc. During emission of light by the light source, the camera may be configured to capture image(s) of the scene of interest.

As the camera may move through the scene of interest, at different times it may be located at different positions with different orientations. The at least one pose estimate of the camera may therefore refer to a sequence of positions and/or orientations of the camera, e.g., relating to a future planned movement of the camera and/or to a predicted future motion of the camera. The sequence of positions of the camera may also comprise only one element. Each pose estimate may comprise both information on a 3D position of a camera center, and orientation information on an orientation of the camera, e.g., with respect to the world coordinate system. Each pose estimate may therefore comprise a 6D information. Each pose estimate in the sequence of positions and/or orientations may be aligned in time with times at which the camera is expected to capture images. In case pose estimate(s) is/are provided at other times, pose estimate(s) at the times at which the camera is expected to capture images may, e.g., be obtained using interpolation. Interpolation may be carried out using any suitable interpolation technique, e.g., spline interpolation or interpolation based on a movement model of the camera.

The pose of the camera may be tracked using a Kalman filter, or any other filtering technique known from the prior art for smoothing, and/or estimating and/or predicting. The method according to the invention may therefore be employed in an iterative, repeating fashion in the following manner: a Kalman filter, for example, may be used for estimating a subsequent estimated pose using a known current pose of the camera (the current pose of the camera is known due to observations, i.e. it typically corresponds to a posterior pose estimate based on observation in a previous iteration of the Kalman filter, or the current pose of the camera may be known due to an (informed) initial guess: in case the camera is mounted on a drone, for example, an informed initial guess may be based on the position of a charging station of the drone); said subsequent estimated pose may be a first pose estimate of the at least one pose estimate. The subsequent estimated pose may correspond to an estimated pose of the camera at a future time at which the camera would acquire a subsequent image. Besides using the filter for just estimating a next subsequent estimated pose, it may be also used for estimating a plurality of future poses of the camera, which plurality of estimated future poses of the camera may then be used as the at least one pose estimate of the camera by the method according to the invention.

The pose of the camera at a given time may be determined using the landmark map and a set of landmarks captured in an image captured by the camera at the given time, e.g., using known algorithmic solutions to the so-called perspective-n-point problem. Alternatively, or in addition, the pose of the camera may also be determined using the Kalman filter itself, that is it may be determined implicitly or explicitly by the Kalman filter. As part of an observation model of the Kalman filter, the Kalman filter may receive, e.g., positions of features corresponding to landmarks in captured images. Additionally, measurements provided by an inertial measurement unit having a known geometrical relationship to the camera may be used for determining the pose of the camera. An inertial measurement unit may be attached to a drone carrying the camera. More generally, the camera, and optionally the inertial measurement unit, may also be carried by a localizing apparatus, possible localizing apparatus being a drone, or a land-based robot, or a VR headset. The pose of the camera may additionally also be determined from control input controlling motion of a localizing apparatus, for example embodied as drone/flying machine or as land-based robot, carrying the camera. As stated, the camera and the light source may therefore also be mounted on a mobile robot, and the Kalman filter may be used for tracking the pose of the mobile robot. The Kalman filter may use control input used for controlling motion of the mobile robot.

The illumination model may be embodied as a physical model linking the emission illumination power to the reflection illumination power received by the camera. The illumination model may therefore model the physical effects leading to power losses and dispersion between emission of illumination light by the light source and reception of reflected illumination light by the camera. The illumination model may also comprise information on the emission behavior of the light source, e.g., whether the light source emits isotropically, i.e., equally in all directions, or non-isotropically, e.g., mostly in a preferred direction. The illumination model may further comprise information about a (spectral and direction-dependent) reflectivity of the landmarks, and about other parameters related to, e.g., a relative translation and rotation between the light source and the camera, (spectral and direction-dependent) attenuation or amplification of camera optics (e.g., lens and filters), aperture size, and spectral sensitivity of an image sensor of the camera. Since lenses of a camera are usually non-isotropic, even in case of an isotropic light source illuminating a landmark, the resulting image of the illuminated landmark may be non-uniform in brightness; the illumination model may take account of such effects as well.

The predefined threshold reflection illumination power may be embodied as a minimum power which needs to be received by the camera for a feature to be detectable in a stable and robust manner. The term stable and robust may be understood to refer to the fact that a feature, i.e., a projection of a landmark into an image, should be distinguishable from background noise. In some embodiments, where the reflection illumination power is a stochastic variable, 'stable and robust' may refer to the fact that a feature is expected to be distinguishable from background noise with a predefined probability. In other embodiments, the predefined threshold reflection illumination power may be determined such that the reflection illumination power is greater than an illumination power received from ambient light sources in the scene of interest. The predefined threshold reflection illumination power may be determined based on the illumination power of ambient light sources that are known or expected to be present in the scene of interest, ambient light sources, e.g., being sun light or lamps and reflections thereof. A landmark projected into a camera image may serve as a feature for pose determination. For the feature to be reliably detectable in an automatic manner, the feature, e.g., may need to be sufficiently bright, from which it follows that the emission illumination power needs to be sufficiently strong. If the feature is sufficiently bright (respectively if the reflection illumination power (received illumination power) of the landmark corresponding to said feature is sufficiently high) compared to the predefined threshold reflection illumination power, the feature may be reliably detected.

The at least one optimized emission illumination power and the illumination time course may refer to a sequence of different emission illumination powers, e.g., emitted at different times by the light source. The time intervals and respective start times at which the light may be emitted with the at least one optimized emission illumination power may be encoded in the illumination time course. The illumination time course may be synchronized with the times at which the camera is configured to capture images.

Emission illumination power is related to emission illumination energy. In a time interval of the illumination time course, emission illumination energy $E_{TX}$ may be defined by the following equation $$E_{TX} = \int_{t_1}^{t_1+T} P_{TX}(t)dt,$$

where $P_{TX}(t)$ is the emission illumination power at time t, and T is the length of a time interval in the illumination time course, and $t_1$ is the start time of said time interval. Often, $P_{TX}(t)$ may be simply a constant, i.e., the emission illumination power in a time interval may not change. In some embodiments, the illumination time course may be synchronized with the camera exposure such that an image is taken by the camera in the same time window between time $t_1$ and $t_1+T$. The emission illumination energy can be minimized by shortening T and/or by decreasing the emission illumination power $P_{TX}$. In case the illumination time course is pre-set, emission illumination power may be minimized by minimizing emission illumination energy: in that case, minimizing emission illumination power and emission illumination energy may be considered as synonymous. Besides low energy consumption, a short illumination time course may have other benefits such as reduced motion blur, better attenuation of outlier light sources (specifically ambient light emitted by external light sources). The illumination time course may, however, not be arbitrarily short: Light sources may exhibit transient behavior during which a truly emitted power is lower than the optimized emission illumination power. On a related note, in case camera exposure (i.e., the times at which the camera captures image(s)) is synchronized to the illumination time course, a short illumination time course may require tight tolerances on time-synchronization as a small shift between camera exposure window and illumination time course can lead to a large discrepancy in received (and recorded) energy. Further, an image sensor of the camera may also exhibit transient behavior, wherein this transient behavior therefore leads to a minimum exposure time. Possible temporal durations of each time interval of the illumination time course may therefore be bounded from below: such lower bounds on time interval(s) may be included during the determining of the optimized emission illumination power and of the illumination time course. The following optimization problem may therefore be solved to obtain the optimized emission illumination power and the optimized illumination time course:

$$\min_{P_{TX}, TC} E_{TX} \text{ s.t.} \begin{cases} P_{TX} \leq P_{max}, \\ |TC| \geq T_{min}, \\ h_1(E_{TX}) \geq 0 \text{ and/or } h_2(E_{TX}) = 0, \end{cases}$$

wherein $P_{TX}$ is the emission illumination power to be optimized, $P_{max}$ is a maximum emission illumination power, e.g., due to hardware limitations of the light source, TC denotes the illumination time course to be optimized, |•| measures duration of its argument, $T_{min}$ corresponds to a minimum illumination time course duration, and $h_1(•)$ and $h_2(•)$ are general constraints on emission illumination energy $E_{TX}$ (these general constraints may also take the illumination time course as argument). The constraint functions $h_1$ and/or $h_2$ may also operate on the emission illumination power.

At a given pose (resp. pose estimate) of the camera, only some landmarks may be visible to the camera. From the visible landmarks, a set of landmarks may be selected (the set may comprise all visible landmarks as well), which set of landmarks may be used for determining the pose of the camera. The emission illumination power may be set in such a way that a sufficiently large set of landmarks can be identified in an image captured by the camera.

Using the at least one pose estimate and the landmark map, distances between some landmarks and the respective pose estimates may be determined. The at least one pose estimate may refer to predictions about the pose of the camera, or the at least one pose estimate may be initialized with previously determined poses in case no prediction is available. The at least one pose estimate may also be initialized with an initial guess of the pose(s) of the camera. These distances can then be used for parametrizing the illumination model, modelling the decay of light power (emission illumination power) between the light source and landmarks and between landmarks and camera. Using the accordingly parametrized illumination model, the at least one optimized emission illumination power can be determined which allows—from the corresponding sequence of images—a reliable detection of sufficiently many features corresponding to landmarks, based on which a corresponding set of poses may be determined. A reliable detection of a feature may, for example, be possible if the reflection illumination power for that feature is larger than the predefined threshold reflection illumination power, e.g., embodied as noise floor of the camera.

In an embodiment of the method according to the invention, the at least one pose estimate comprises a first pose estimate, and the determining of the at least one optimized emission illumination power provides a first optimized emission illumination power, wherein the determining of the first optimized emission illumination power comprises as steps: (a) determining distances between the first pose estimate and the 3D location of the plurality of landmarks, (b) sorting the distances in an ascending order or descending order, (c) choosing an M-th distance from the sorted distances, and (d) using the M-th distance for determining the first optimized emission illumination power using at least the illumination model.

In fact, the above may be a solution to the optimization problem $$\min_{E_{TX}} E_{TX} \text{ s.t. } N(E_{TX}) \geq M$$

where $N(E_{TX})$ is the number of landmarks that are expected to be visible given the emission illumination energy and the at least one pose estimate.

In case the distances are sorted in ascending order, the M-th distance corresponds to the M-th landmark, wherein the previous M-1 landmarks have closer (or equal) distance to the first pose estimate, and the remaining landmarks have a further (or equal) distance to the first pose estimate than the M-th landmark. The optimized emission illumination power can be set in such a way that the reflection illumination power for the M-th landmark is equal or larger than the predefined threshold reflection illumination power, guaranteeing that if the light source is isotropic the first M landmarks appear sufficiently bright (sufficient brightness may be determined using the illumination model). Preferably, only those landmarks which can be seen by the camera at the first pose estimate are considered, i.e., for those landmarks which cannot be seen by the camera at the first pose estimate a distance to the first pose estimate may not be determined. Analogous reasoning applies to distances sorted in descending order. In case the light source does not emit light isotropically, as is typically the case in practice, the optimization problem given in the previous paragraph could be solved as follows: for all landmarks, a corresponding expected received power given a dummy emission illumination power may be computed; these expected received powers could subsequently be ordered by descending power; an M-th entry from the ordered expected received powers could be selected, corresponding to an M-th landmark; finally, the dummy emission illumination power could be scaled such that received power of the M-th landmark is greater than or equal to the threshold received power.

In a further embodiment of the method according to the invention, the at least one optimized emission illumination power is determined using a constrained optimization algorithm with a predefined illumination time course, wherein the constrained optimization algorithm is configured to extremize a cost function while fulfilling constraints.

The illumination time course may be pre-set (predefined). The starting times and duration of intervals during which light with the at least one optimized emission illumination power is emitted may therefore be set outside of the constrained optimization algorithm. A pre-set illumination time course may be synchronized to image acquisition times by the camera.

In a further embodiment of the method according to the invention, the constrained optimization algorithm is configured to minimize or maximize the cost function, by varying at least the at least one emission illumination power. Alternatively, the corresponding at least one emission illumination energy may be varied to minimize or maximize the cost function.

In a further embodiment of the method according to the invention, the illumination model comprises illumination model parameters, wherein at least one of the illumination model parameters is a stochastic parameter, wherein determining the at least one optimized emission illumination power involves stochastically propagating illumination model parameter uncertainty through the illumination model. In case stochastic parameters are present, cost functions used for optimizing emission illumination power may change accordingly, e.g., an expected cost may be minimized (or any other suitable metric such as the 95th percentile).

Some parameters of the illumination model may only be known with limited accuracy. To accommodate such uncertainty, the illumination model may be used with sampling-based techniques, e.g., Monte-Carlo based methods. Determining the at least one optimized emission illumination power can take into account illumination model uncertainty, i.e., the determined at least one optimized emission illumination power can be a stochastic quantity, and as deterministic quantity a mean of said stochastic quantity can be chosen, for example.

In a further embodiment of the method according to the invention, the cost function corresponds to the emission illumination energy, wherein extremizing the cost function while fulfilling the constraints provides the at least one optimized emission illumination power. In case the illumination time course is pre-set, minimizing or maximizing the emission illumination energy would directly correspond to minimizing or maximizing the emission illumination power.

In a further embodiment of the method according to the invention, the first pose estimate comprises a first pose estimate uncertainty, wherein the first optimized emission illumination power is determined together with a posterior first pose estimate uncertainty of the camera, which posterior first pose estimate uncertainty is determined, together with the first optimized emission illumination power, using at least (i) the first pose estimate and the first pose estimate uncertainty, (ii) the illumination model, and (iii) a localization model for determining a pose of the camera using positions of landmarks in an image acquired by the camera at the pose, wherein the first optimized emission illumination power is determined in such a way that the posterior first pose estimate uncertainty is below a predefined posterior uncertainty threshold.

Together with the determining of the posterior first pose estimate uncertainty, a posterior first pose estimate of the camera may be determined as well. The first pose estimate may, e.g., correspond to an estimate of the pose of the camera at a time $t_1$ at which the camera is configured to capture an image. The posterior first pose estimate may, e.g., correspond to a posterior estimate of the pose of the camera at the time $t_1$, the posterior estimate being obtained using the image captured by the camera at the time $t_1$ while the light source illuminates the scene of interest with the first optimized emission illumination power. The first optimized emission illumination power may be determined by way of a joint minimization, minimizing both emission illumination power and the posterior first pose estimate uncertainty at the same time. Within this joint minimization, at least the following steps may need to be carried out: 1) given a currently considered emission illumination power and the first pose estimate, determine—using the illumination model—how the landmarks would appear in an image captured at the time $t_1$ if the scene of interest would be illuminated with the currently considered emission illumination power; 2) determine, using the simulated appearance of the projected landmarks in the image and the first pose estimate, the posterior first pose estimate using the localization model.

The localization model may be an algorithm solving the perspective-n-point problem, and/or the localization model may be implicitly provided by a Kalman filter. The first optimized emission illumination power may therefore be determined in such a way that a set of features corresponding to landmarks, captured by the camera at a first pose corresponding to the first pose estimate at the time $t_1$, can be reliably detected and from said set of features the posterior first pose can be determined with sufficiently small uncertainty at the same time $t_1$. The joint minimization may be used to minimize the first emission illumination power, while at the same time allowing posterior first pose determination with sufficiently high accuracy.

In a further embodiment of the method according to the invention, the first optimized emission illumination power is determined together with a second pose estimate uncertainty of the camera, which second pose estimate uncertainty is determined, together with the first optimized emission illumination power, by additionally using a movement model of the camera, wherein the first optimized emission illumination power is determined in such a way that the second pose estimate uncertainty, obtained by forward-projecting the posterior first pose estimate uncertainty using the movement model to a time $t_2$, $t_2 > t_1$, at which the camera is configured to capture a subsequent image, is below a predefined uncertainty threshold.

Together with the determining of the second pose estimate uncertainty, a second pose estimate of the camera may be determined as well. Using a tracking model, e.g., a Kalman filter, for tracking the pose of the camera, the posterior first pose estimate and the posterior first pose estimate uncertainty may be forward-projected, using the movement model of the camera, to a time $t_2$, this forward-projecting providing a second pose estimate and a second pose estimate uncertainty. Typically, a posterior first pose estimate uncertainty of the first pose estimate is smaller than a second pose estimate uncertainty of the second pose estimate. The movement model may also use control input used for controlling a drone, for example, carrying the camera and the light source, as well as perturbation noise. The light source and camera may also be mounted on a mobile robot, and the movement model may use control input used for controlling the movement of the mobile robot. The first optimized emission illumination power may be set in such a way that sufficiently many features may be determined well enough from an image captured by the camera at a first pose corresponding to the first pose estimate, so that the second pose estimate uncertainty is below the predefined uncertainty threshold. Starting with the first pose estimate having a first pose estimate uncertainty, the first optimized emission illumination power may therefore be set in such a way that the second pose estimate uncertainty is sufficiently low.

In a further embodiment of the method according to the invention, the first optimized emission illumination power is determined by solving the following constrained optimization problem $$\min_{E_{TX}} E_{TX} \quad \text{s.t.} \quad \|\Sigma_p(E_{TX})\| < \sigma_{p,max},$$

wherein $E_{TX}$ is the energy of the emitted light delivered in the predefined illumination time course, $\|\cdot\|$ is a matrix norm, $\Sigma_p(E_{TX})$ is a covariance matrix relating to the posterior first pose estimate uncertainty, which covariance matrix depends on the energy of the emitted light, wherein the posterior first pose estimate is determined based on landmarks which are detectable in the image in case the emitted light has energy $E_{TX}$, and wherein $\sigma_{p,max}$ is the predefined posterior uncertainty threshold. Instead of having a constraint relating to the posterior first pose estimate uncertainty, a constraint on a covariance matrix relating to the second pose estimate uncertainty could be used, the constraint being that a matrix norm of the covariance matrix relating to the second pose estimate uncertainty is smaller than the predefined uncertainty threshold. The constrained optimization problem could also be set up in such a way that both constraints on a covariance matrix relating to the posterior first pose estimate uncertainty and on a covariance matrix relating to the second pose estimate uncertainty are present. $E_{TX}$ may correspond to the energy emitted by the light source in a fixed interval of time, and the camera may capture the image during this fixed interval of time.

In a further embodiment of the method according to the invention, the constrained optimization algorithm is relaxed to an unconstrained optimization algorithm, $$\min_{E_{TX}} E_{TX} + \lambda \|\Sigma_p(E_{TX})\|,$$

wherein $\lambda$ is a scaling parameter. By varying the scaling parameter, varying emphasis can be placed on energy minimization or on uncertainty minimization. $\Sigma_p(E_{TX})$ may be a covariance matrix relating to the posterior first pose estimate uncertainty, or $\Sigma_p(E_{TX})$ may be a covariance matrix relating to the second pose estimate uncertainty; alternatively, both covariance matrices may be included in the cost function as well.

In a further embodiment of the method according to the invention, the first optimized emission illumination power is determined by solving the following constrained optimization problem $$\max_{E_{TX}} E_{TX} \quad \text{s.t.} \quad E_{RX,Ix} < E_{RX,max} \quad \forall \ Ix,$$

wherein $E_{TX}$ is the energy of the emitted light delivered in the predefined illumination time course, Ix is an index over at least a subset of the plurality of landmarks, wherein $E_{RX,Ix}$ is a reflection illumination energy corresponding to the Ix-th landmark, and $E_{RX,max}$ is a reflection illumination energy at which the camera saturates.

Such an optimization problem may therefore be used for determining a first optimized emission illumination power which is as large as possible without saturating a sensor of the camera at the features corresponding to the landmarks used in the optimization.

In a further embodiment of the method according to the invention, an instruction is provided in case the constraints of the constrained optimization algorithm are at least partly violated after extremization and/or in case the unconstrained optimization algorithm is not sufficiently optimizable, the instruction comprising information on the constraints which are violated. The term "sufficiently optimizable" may refer to a situation in which the cost function of the unconstrained optimization algorithm cannot be made small enough; in the case that the cost function corresponds to the emission illumination power (or to the emission illumination energy), for example, "small enough" may refer to the cost function being smaller than a pre-set power or energy threshold; said pre-set power or energy threshold may, e.g., be pre-set in such a way that a battery-powered light source—e.g. in case the light source is operated for a pre-set time with the pre-set power—can continue operating for at least the pre-set time before needing to be recharged.

In a further embodiment of the method according to the invention, the illumination model is configured to model an isotropically emitting light source.

In a further embodiment of the method according to the invention, the illumination model is embodied as follows $$P_{RX} = \frac{1}{4\pi d^2} P_{TX} R_A A_R \frac{1}{d^2} \frac{\pi f^2}{4N^2},$$

wherein $P_{RX}$ is the reflection illumination power (which may be arriving at an image sensor of the camera, being captured by a lens system of the camera), $P_{TX}$ is the emission illumination power, f is the focal length of the camera (specifically of the lens system of the camera), N is the f-number of the camera, $R_A$ is a landmark reflectivity of a reflector landmark, wherein at least one landmark of the plurality of landmarks is embodied as said reflector landmark, $A_R$ is a projected surface area of said reflector landmark as viewed from the light source, and d is the distance between the light source and said reflector landmark.

A reflector landmark is a landmark that reflects light. A reflector landmark may be embodied as a retroreflector, and the landmark reflectivity may correspond to a coefficient of retroreflection.

If, at a given time, it is known that n features corresponding to landmarks are to be captured by the camera, n being a natural number, e.g., larger than two, and if it is known that the distance between the camera/light source and, among the n landmarks, the landmark furthest away from the camera/light source is $d_{max}$ away, then an optimized emission illumination power may be computed by substituting $d_{max}$ into above illumination model. The other parameters parametrizing the above illumination model may be stored in memory, or potentially also in the landmark map (which may be stored in memory as well).

In a further embodiment of the method according to the invention, the illumination model is configured to model a non-isotropically emitting light source, wherein the light source is embodied as a directional light source.

A directional light source may preferentially emit light into a directional light emission direction.

In a further embodiment of the method according to the invention, the determining of the at least one optimized emission illumination power comprises comparing the predefined threshold reflection illumination power to a predicted received illumination power using the illumination model, wherein the at least one optimized emission illumination power is set in such a way that the corresponding at least one predicted received illumination power is equal to or greater than the predefined threshold reflection illumination power.

In a further embodiment of the method according to the invention, the illumination model parameters are updated based on a deviation between the predicted received illumination power and measured received illumination power.

A predicted received illumination power (the term received illumination power corresponds to the term reflection illumination power) which strongly differs from a measured received illumination power, e.g., at a feature in a captured image corresponding to a retroreflector, may indicate that some parameters in the illumination model have wrong values. Such parameters may be updated based on such a deviation. In case a measured received illumination power of a feature is, e.g., far smaller than a predicted received illumination power, this information may, e.g., indicate that a reflectivity parameter of the landmark corresponding to said feature, which reflectivity parameter may be used for determining the emission illumination power, is assigned a too large value and in fact may need to be assigned a smaller value. In general, the illumination model comprises parameters, and some of these parameters may be assumed to be known with greater precision than others. Focal length and f-number may, for example, be precisely known, while landmark reflectivity R A may be known with less precision, for example. Parameters which are known with sufficient accuracy may be considered as inputs to the illumination model, for example, while parameters which are known with insufficient accuracy may be taken as parameters which may need to be updated. Updating the parameters known with insufficient accuracy may proceed by varying these parameters until predicted received illumination power (of a batch of features or of a single feature corresponding to projected landmarks) is sufficiently close to measured received illumination power (reflection illumination power) of the batch of features or of the single feature. To carry out such a parameter updating of parameters in the illumination model, a matching between features and landmarks may need to be available, i.e., it may need to be known which landmark corresponds to a specific detected feature. Based on measurements (reflection illumination power) as well as inputs to the illumination model, it may be possible to solve for the parameters in an optimization problem (e.g., based on least-squares). A least-squares approach may be based on batch-least-squares, or a least-squares approach may be based on recursive least squares, wherein for recursive least squares parameters of the illumination model may be updated after each measured reflection illumination power (corresponding to a detected feature). This may also be realized with a Kalman Filter, wherein recursive least squares may be embedded in a Kalman filter (which additionally comprises a state-transition model, e.g., embodied as constant function plus state-transition process noise).

In a further embodiment of the method according to the invention, the illumination model parameters which are updated comprise reflectivity parameters of the landmarks.

In a further embodiment of the method according to the invention, the at least one pose estimate comprises a plurality of pose estimates and the at least one optimized emission illumination power comprises a plurality of optimized emission illumination powers, the plurality of pose estimates and optimized emission illumination powers relating to a planned and/or predicted movement of the camera, and adapting the planned and/or predicted movement based on an output of the constrained optimization algorithm.

In case the constrained optimization algorithm cannot provide a sufficiently good output (e.g., if a minimization results in a too 'large' output value, or a maximization provides a too 'small' output value of the cost function), this might serve as a sign that the planned movement of the camera may need to be adapted. Adaptation of the planned movement of the camera and emission illumination power optimization may be carried out using a joint optimization algorithm.

In a further embodiment of the method according to the invention, the at least one optimized emission illumination power is determined by solving the following constrained optimization problem $$\min_{\begin{pmatrix} E_{TX,1} \\ E_{TX,2} \\ \vdots \\ E_{TX,J} \end{pmatrix}} \sum_{i=1}^{J} E_{TX,i} \text{ s.t. } g\left(\begin{pmatrix} E_{TX,1} \\ E_{TX,2} \\ \vdots \\ E_{TX,J} \end{pmatrix}\right) \geq 0,$$

wherein J is a natural number denoting that emission illumination power is to be minimized for J subsequent images and wherein emission illumination energies $E_{TX,i}$, $E_{TX,i}$ being the energy of the i-th emission of light, for the J subsequent images are arranged in a vector, and wherein the cost function is embodied as sum over the J emission illumination energies, and wherein g is a constraint function embodied as vector-valued function or as scalar-valued function which takes the vector comprising the J emission illumination energies as input. In this constrained optimization problem, a minimization over a plurality of emission illumination energies is carried out. In case the illumination time course is pre-determined, minimization over emission illumination energies corresponds to minimization over emission illumination powers. Besides modelling an inequality, g may as constraint function also comprise equality constraints. The constraint function g may, e.g., be such that at least M landmarks are visible in the J images, or the constraint function g may be related to the uncertainty of the pose estimate after the J images are captured. The cost function may also be determined as a more general vector norm (since emission illumination energies are always greater than or equal to zero, the provided cost function corresponds to a 1-norm on the vector space in which the vector resides), e.g., as Euclidean norm. Optimization may proceed by varying emission illumination energies. The optimization may, for example, determine that the light source should only emit light during the capturing of fewer than J images.

In some situations, a planned future movement of the camera in the scene of interest may be provided. During this planned future movement, J images may be captured by the camera. Since the landmark map comprising 3D location information of a plurality of landmarks is given, and in case J planned positions and orientations of the camera may be provided at the times at which the J images are planned to be taken, distances between the camera at each of the J planned positions and orientations and the plurality of landmarks may be determined and used for emission illumination power optimization. The cost function may be further constrained, e.g., by requiring that the emission illumination power of the J emissions of light is such that uncertainties in the J determined positions and orientations of the camera which may be determined from the J future images and the landmark map are smaller than some uncertainty thresholds.

In a further embodiment of the method according to the invention, the predefined threshold reflection illumination power corresponds to a ground state noise floor power of the camera. The predefined threshold reflection illumination power may also be algorithmically determined: a feature extraction algorithm applied to the image(s) may require—in order to have sufficiently high detection success—that pixels corresponding to features are sufficiently bright relative to a background signal.

According to a further aspect of the present invention there is provided a computer program product comprising instructions which when executed by a computer, cause the computer to carry out a method according to the invention.

According to a further aspect of the present invention there is provided an assembly, comprising (a) a light source, (b) a camera, (c) a plurality of landmarks, and (d) a controller, which controller is configured to carry out a method according to the invention.

In the assembly, the light source and the camera are preferentially arranged close to each other.

In an embodiment of the assembly according to the invention, at least some of the landmarks are embodied as retroreflectors. Some of the landmarks may also be embodied as reflectors with a priori known/estimated reflectivity.

BRIEF DESCRIPTION OF DRAWINGS

Exemplary embodiments of the invention are disclosed in the description and illustrated by the drawings in which.

DETAILED DESCRIPTION OF DRAWINGS

Figure 1:
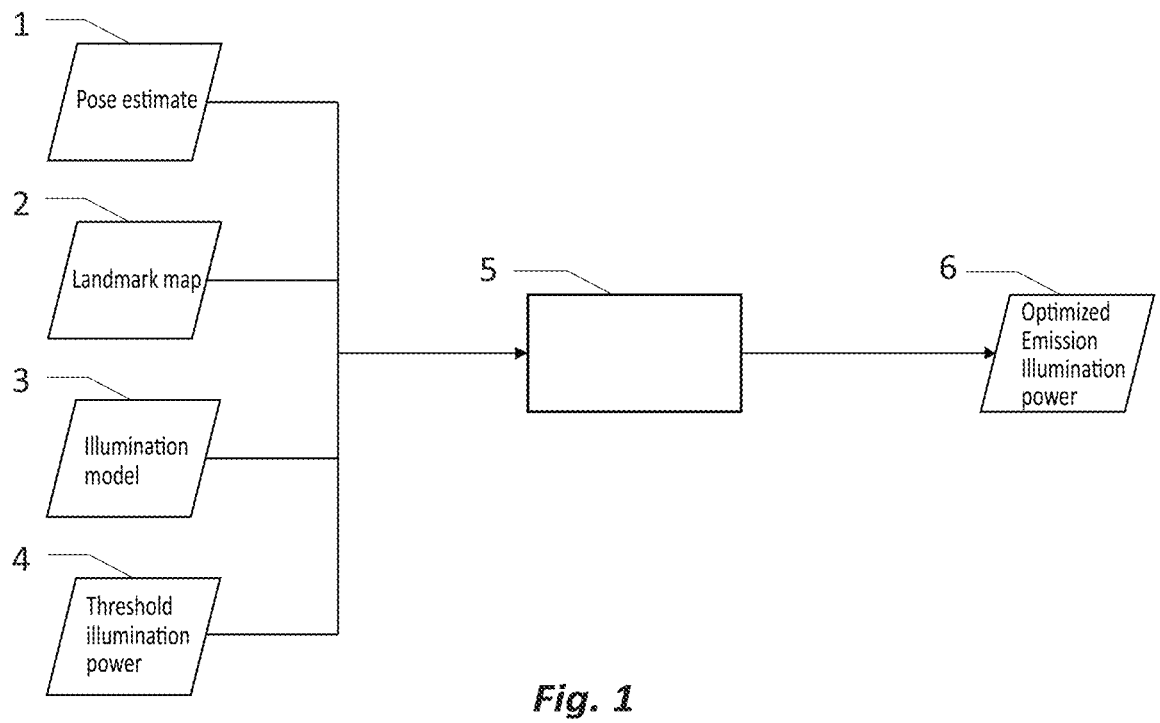
FIG. 1 shows a schematic depiction of the method, according to an embodiment of the present invention, for controlling a light source.

FIG. 1 shows a schematic depiction of the method, according to an embodiment of the present invention, for controlling a light source. The method receives at least one pose estimate 1, a landmark map 2, an illumination model 3 and a predefined threshold illumination power 4 as input. Using these inputs, at least one optimized emission illumination power 6 and an illumination time course 6 are determined 5.

The at least one pose estimate 1 may relate to a 3D position and orientation of a camera, which camera is configured to capture images of a scene of interest. The scene of interest may be in an indoor environment, e.g., a warehouse in which a drone carrying at least a camera and a light source may need to navigate. In case the at least one pose estimate comprises a plurality of pose estimates, these pose estimates may be related to 3D positions and orientations of the camera at times at which a corresponding plurality of images is captured by the camera. A plurality of pose estimates may relate to poses of the camera at future times, e.g., to a planned and/or estimated future motion of the camera. Future motion may be at least partly inferred from past motion, e.g., using a Kalman filter for extrapolation, and/or may be obtained from control input. A drone carrying the camera may have inertia, which inertia may prohibit arbitrarily fast movement changes.

A drone carrying the camera and the light source may operate in an indoor environment equipped with landmarks, which landmarks may be used by the drone to determine its current location in the indoor environment. In prior art, the problem of 3D pose determination of a calibrated camera using images of such external landmarks captured by said calibrated camera is known as perspective-n-point problem. If sufficiently many landmarks with known position in a world coordinate system are visible in an image captured by the camera (two landmarks may need to be visible in case additional orientation information of the projected landmarks is available, or generally three landmarks may need to be visible), a pose of the calibrated camera may be determined using known algorithmic solutions. A 3D pose of the camera may also be determined using an inertial measurement unit (IMU) attached to the drone, using a known coordinate transformation between the IMU and the camera, or by a combination of inertial measurements and computer-vision-based pose determination algorithms, potentially combined using a Kalman filter. A Kalman filter may also be used for determining a pose. Pose estimates may be provided by a Kalman filter through extrapolation.

For a computer-vision-based pose determination of the calibrated camera, e.g., using well-known algorithmic solutions to the perspective-n-point problem, sufficiently many landmarks may need to be visible in an image captured by the calibrated camera. In order to facilitate landmark detection and visibility in images, at least some landmarks may be embodied as retroreflectors, which retroreflectors may be installed at known positions in the scene of interest. In case a light source is mounted in vicinity to the camera on the drone, and said light source is used for emitting light, the retroreflector may be clearly visible in an image captured by the camera. The landmark map 2 may comprise information on the positions on landmarks in a world coordinate system. The landmark map 2 may also be determined using a simultaneous-localization-and-mapping (SLAM) algorithm carried out while the drone carrying the camera and the light source moves about the environment.

The illumination model 3 describes how much of the power emitted by the light source arrives at the camera after reflection by a landmark, e.g., a retroreflector. The illumination model 3 is therefore preferentially a physical model, which physical model may describe the power losses occurring between light emission by the light source and light reception by the camera. The illumination model 3 may therefore, e.g., need to reflect whether the light source is an isotropically or non-isotropically emitting light source, whether a landmark reflects diffusely or narrowly etc. Some parameters of the illumination model 3 may be only known approximately. In this case, these parameters may be estimated during operation of the drone carrying the camera and light source, and/or may be continuously tracked in case they are changing over time. The illumination model 3 may comprise information on the distance between light source and landmark, in particular embodied as retroreflector, and between landmark and camera. Some parameters of the illumination model 3 may therefore differ between different landmarks, e.g., due to different distances of landmarks to the light source.

Using the illumination model 3, it may be determined how much—virtually—emitted light power reaches the camera, specifically the subset of pixels of an image sensor of the camera onto which the corresponding landmark is imaged. In order for the captured feature (image of the illuminated landmark) to be detectable in a reliable and accurate manner from an image, the captured feature needs to be sufficiently bright. The output of the illumination model 3 may therefore be virtually compared to the predefined threshold illumination power 4, which predefined threshold illumination power 4 may, e.g., relate to a noise floor of the camera. This way, an optimized emission illumination power of power emitted by the light source may be determined which may guarantee that a specific landmark can be detected in a reliable manner in an image.

For pose determination of the camera using projections of landmarks into a captured image, a specific set of landmarks may be chosen. The chosen set of landmarks may be chosen in such a way that reliable pose determination can be achieved, e.g., landmarks whose projections into an image are too close to each other may be disregarded. The optimized emission illumination power may be set in such a way so as to facilitate detection of the chosen set of landmarks in a captured image. The optimized emission illumination power is determined based on the at least one pose estimate 1. At any given camera pose, it may not be possible to see all landmarks with the camera. In the optimization of power for the emission illumination power, such landmarks which are not visible may be disregarded. Landmarks which are currently not visible but may become visible at a later timepoint—e.g., using knowledge of a planned and/or predicted movement of a drone carrying the camera—may, however, be included in the emission illumination power optimization process, while landmarks which are currently visible but may disappear at a later timepoint—e.g., using knowledge of a planned and/or predicted movement of the drone—may potentially be disregarded in the emission illumination power optimization process, e.g., in case the emission illumination power is determined for a future pose of the camera.

Determining 5 the optimized emission illumination power 6 may be carried out using an optimization algorithm, in particular a constrained optimization algorithm. Once a set of landmarks is determined, distances between the camera and the chosen set of landmarks may be determined using the at least one pose estimate and the landmark map. The determined distances can then be used for parametrizing the illumination model 3, which illumination model 3 is used for providing a link between the emission illumination power and a received illumination power received by the camera (the term received illumination power corresponds to the term reflection illumination power). The optimized illumination power then provides a set of features in an image captured by the camera, which set of features can be used for pose determination. The pose estimate provided as input may in this way be transformed into a determined pose, i.e., into a posterior pose estimate, e.g., by using a Kalman filter.

Figure 2:
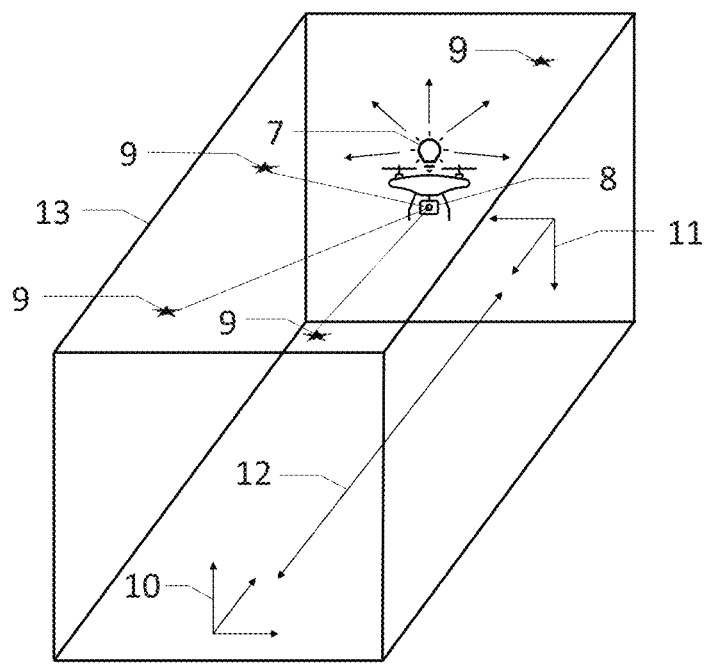
FIG. 2 shows a schematic depiction of a drone comprising a light source and a camera, wherein the drone is configured to fly in an indoor environment, wherein landmarks are arranged at a plurality of positions in said indoor environment.

FIG. 2 shows a schematic depiction of a drone comprising a light source 7 and a camera 8, which drone is flying in an indoor environment 13. Landmarks 9, in particular embodied as retroreflectors, are arranged at a plurality of positions in the indoor environment 13, which indoor environment 13 may be a scene of interest. The landmarks 9 may be mounted on a ceiling in the scene of interest 13. Instead of being mounted to a ceiling in the scene of interest 13, the landmarks 9 may also be an integral part of the scene of interest 13 and may also be located on walls and/or a floor of the scene of interest 13. At any given pose of the drone, some landmarks 9 may be visible to the camera 8—in FIG. 2 indicated by lines between the landmarks 9 and the camera 8—while other landmarks 9 may not be visible to the camera 8. The positions of the landmarks 9 may be known in a world coordinate system 10, and the current location of the drone may be expressed in a drone coordinate system 11, wherein a coordinate transformation 12 may be known between the world coordinate system 10 and the drone coordinate system 11. In case the camera 8 and the light source 7 are mounted rigidly to the drone, the pose of the camera 8 and of the light source 7 can be related to the world coordinate system 10 using the drone coordinate system 11. The current position of the drone can be determined using image(s) of the scene of interest 13, specifically of the landmarks 9 having known positions. Alternatively, or in addition, the drone may be equipped with an inertial measurement unit, which inertial measurement unit may be also used for pose determination. The light source 7 may be an isotropically emitting light source, or it may be a directional light source emitting in a non-isotropic manner. Light source 7 and camera 8 are ideally close to each other, specifically in case the landmarks 9 are embodied as retroreflectors. The camera 8 may also be mounted on top of the drone, i.e., next to the light source 7.

The invention claimed is:

1. Method for controlling a light source, the method using (a) at least one pose estimate of a camera configured to capture one or more images of a scene of interest which comprises at least one landmark, as said light source is operated to emit light which illuminates said scene of interest, (b) a landmark map comprising at least 3D location information of a plurality of landmarks comprising the at least one landmark in the scene of interest, (c) an illumination model describing a relationship between an emission illumination power and a reflection illumination power, wherein said emission illumination power is the power of light emitted by the light source to illuminate said scene of interest, and said reflection illumination power is the illumination power of light reflected by one or more landmarks in said scene of interest and received by the camera, and (d) a predefined threshold reflection illumination power, wherein the method comprises the following steps:

(1) determining, for at least one of the plurality of landmarks, at least one optimized emission illumination power of light to be emitted by the light source, wherein the optimized emission illumination power is a solution to an optimization problem for energy of the emitted light delivered in the predefined illumination time course, and an illumination time course during which the light source should be operated to emit light which has an emission illumination power which is equal to the at least one optimized emission illumination power, using (i) the at least one pose estimate of the camera, (ii) the 3D location information of the at least one of the plurality of landmarks, (iii) the illumination model, and (iv) the predefined threshold reflection illumination power; and (2) operating the light source to emit light which has an emission illumination power which is equal to the at least one optimized emission illumination power, for a time period which is equal to the determined illumination time course.

2. Method according to claim 1, wherein the at least one pose estimate comprises a first pose estimate, and wherein the determining of the at least one optimized emission illumination power provides a first optimized emission illumination power, wherein the determining of the first optimized emission illumination power comprises as steps: (a) determining distances between the first pose estimate and the 3D location of the plurality of landmarks, (b) sorting the distances in an ascending order or descending order, (c) choosing an M-th distance from the sorted distances, and (d) using the M-th distance for determining the first optimized emission illumination power using at least the illumination model.

3. Method according to claim 1, wherein the at least one optimized emission illumination power is determined using a constrained optimization algorithm with a predefined illumination time course, wherein the constrained optimization algorithm is configured to extremize a cost function while fulfilling constraints.

4. Method according to claim 3, wherein the constrained optimization algorithm is configured to minimize or maximize the cost function, by varying at least the at least one emission illumination power.

5. Method according to claim 1, wherein the illumination model comprises illumination model parameters, wherein at least one of the illumination model parameters is a stochastic parameter, wherein determining the at least one optimized emission illumination power involves stochastically propagating illumination model parameter uncertainty through the illumination model.

6. Method according to claim 3, wherein the cost function corresponds to the emission illumination energy, wherein extremizing the cost function while fulfilling the constraints provides the at least one optimized emission illumination power.

7. Method according to claim 1, wherein the at least one pose estimate comprises a first pose estimate and wherein the first pose estimate comprises a first pose estimate uncertainty, wherein the first optimized emission illumination power is determined together with a posterior first pose estimate uncertainty of the camera, which posterior first pose estimate uncertainty is determined, together with the first optimized emission illumination power, using at least (i) the first pose estimate and the first pose estimate uncertainty, (ii) the illumination model, and (iii) a localization model for determining a pose of the camera using positions of landmarks in an image acquired by the camera at the pose, wherein the first optimized emission illumination power is determined in such a way that the posterior first pose estimate uncertainty is below a predefined posterior uncertainty threshold.

8. Method according to claim 7, wherein the first optimized emission illumination power is determined together with a second pose estimate uncertainty of the camera, which second pose estimate uncertainty is determined, together with the first optimized emission illumination power, by additionally using a movement model of the camera, wherein the first optimized emission illumination power is determined in such a way that the second pose estimate uncertainty, obtained by forward-projecting the posterior first pose estimate uncertainty using the movement model to a time $t_2$, $t_2 > t_1$, at which the camera is configured to capture a subsequent image, is below a predefined uncertainty threshold.

9. Method according to claim 7, wherein the first optimized emission illumination power is determined by solving the following constrained optimization problem $$\min_{E_{TX}} E_{TX} \text{ s.t. } \|\Sigma_p(E_{TX})\| < \sigma_{p,max},$$

wherein $E_{TX}$ is the energy of the emitted light delivered in the predefined illumination time course, $\|\cdot\|$ is a matrix norm, $\Sigma_p(E_{TX})$ is a covariance matrix relating to the posterior first pose estimate uncertainty, which covariance matrix depends on the energy of the emitted light, wherein the posterior first pose estimate is determined based on landmarks which are detectable in the image in case the emitted light has energy $E_{TX}$, and wherein $\sigma_{p,max}$ is the predefined posterior uncertainty threshold.

10. Method according to claim 7, wherein the constrained optimization algorithm is relaxed to an unconstrained optimization algorithm, $$\min_{E_{TX}} E_{TX} + \lambda \|\Sigma_p(E_{TX})\|,$$

wherein $\lambda$ is a scaling parameter.

11. Method according to claim 3, wherein the first optimized emission illumination power is determined by solving the following constrained optimization problem $$\max_{E_{TX}} E_{TX} \text{ s.t. } E_{RX,Ix} < E_{RX,max} \quad \forall \, Ix,$$

wherein $E_{TX}$ is the energy of the emitted light delivered in the predefined illumination time course, Ix is an index over at least a subset of the plurality of landmarks, wherein $E_{RX,Ix}$ is a reflection illumination energy corresponding to the Ix-th landmark, and $E_{RX,max}$ is a reflection illumination energy at which the camera saturates.

12. Method according to claim 3, comprising providing an instruction in case the constraints of the constrained optimization algorithm are at least partly violated after extremization and/or in case the unconstrained optimization algorithm is not sufficiently optimizable, the instruction comprising information on the constraints which are violated.

13. Method according to claim 1, wherein the illumination model is configured to model an isotropically emitting light source.

14. Method according to claim 13, wherein the illumination model is embodied as follows $$P_{RX} = \frac{1}{4\pi d^2} P_{TX} R_A A_R \frac{1}{d^2} \frac{\pi f^2}{4N^2},$$

wherein $P_{RX}$ is the reflection illumination power, $P_{TX}$ is the emission illumination power, f is the focal length of the camera, N is the f-number of the camera, $R_A$ is a landmark reflectivity of a reflector landmark, wherein at least one landmark of the plurality of landmarks is embodied as said reflector landmark, $A_R$ is a projected surface area of said reflector landmark as viewed from the light source, and d is the distance between the light source and said reflector landmark.

15. Method according to claim 1, wherein the illumination model is configured to model a non-isotropically emitting light source, wherein the light source is embodied as a directional light source.

16. Method according to claim 1, wherein the determining of the at least one optimized emission illumination power comprises comparing the predefined threshold reflection illumination power to a predicted received illumination power using the illumination model, wherein the at least one optimized emission illumination power is set in such a way that the corresponding at least one predicted received illumination power is equal to or greater than the predefined threshold reflection illumination power.

17. Method according to claim 1, comprising updating the illumination model parameters based on a deviation between the predicted received illumination power and measured received illumination power.

18. Method according to claim 1, wherein the at least one pose estimate comprises a plurality of pose estimates and wherein the at least one optimized emission illumination power comprises a plurality of optimized emission illumination powers, the plurality of pose estimates and optimized emission illumination powers relating to a planned and/or predicted movement of the camera, and adapting the planned and/or predicted movement based on an output of the constrained optimization algorithm.

19. Method according to claim 18, wherein the at least one optimized emission illumination power is determined by solving the following constrained optimization problem $$\min_{\begin{pmatrix} E_{TX,1} \\ E_{TX,2} \\ \vdots \\ E_{TX,J} \end{pmatrix}} \sum_{i=1}^{J} E_{TX,i} \text{ s.t. } g\left(\begin{pmatrix} E_{TX,1} \\ E_{TX,2} \\ \vdots \\ E_{TX,J} \end{pmatrix}\right) \geq 0,$$

wherein J is a natural number denoting that emission illumination power is to be minimized for J subsequent images and wherein emission illumination energies $E_{TX,i}$, $E_{TX,i}$ being the energy of the i-th emission of light, for the J subsequent images are arranged in a vector, and wherein the cost function is embodied as sum over the J emission illumination energies, and wherein g is a constraint function embodied as vector-valued function or as scalar-valued function, and taking the vector comprising the J emission illumination energies as input.

20. A non-transitory storage medium containing computer program product comprising instructions which when executed by a computer, cause the computer to carry out a method according to claim 1.

21. Assembly, comprising (a) a light source, (b) a camera, (c) a plurality of landmarks, and (d) a controller which is configured to carry out a method according to claim 1.

* * * * *